United States Patent [19]

Lippert et al.

[11] Patent Number: 4,973,459
[45] Date of Patent: Nov. 27, 1990

[54] APPARATUS AND METHOD FOR REMOVING GASEOUS CONTAMINANTS AND PARTICULATE CONTAMINANTS FROM A HOT GAS STREAM

[75] Inventors: Thomas E. Lippert, Murrysville; David F. Ciliberti, deceased, late of Murrysville, both of Pa., by Paula Ciliberti, executrix

[73] Assignee: Westinghouse Electric Corp., Pittsburgh, Pa.

[21] Appl. No.: 351,497

[22] Filed: May 9, 1989

[51] Int. Cl.$^5$ .................. C01B 17/00; B01D 53/06
[52] U.S. Cl. .................. 423/244; 55/79; 55/73; 55/74; 55/390; 55/523; 55/302; 422/139
[58] Field of Search ........... 55/73, 74, 72, 79, 99, 55/181, 390, 474, 523, 302; 422/139, 144, 145, 169, 170; 423/244 R, 244 A

[56] References Cited

U.S. PATENT DOCUMENTS

| | | | |
|---|---|---|---|
| 2,875,844 | 3/1959 | Pring | 55/77 |
| 3,992,176 | 11/1976 | Bohne et al. | 55/79 X |
| 4,343,631 | 8/1982 | Ciliberti | 55/302 |
| 4,475,931 | 10/1984 | Cliff et al. | 55/77 |
| 4,645,653 | 2/1987 | Kimura | 423/244 A X |
| 4,650,647 | 3/1987 | Kito et al. | 55/474 X |

OTHER PUBLICATIONS

"The Use of Fluidized Beds to Filter Gases at High Temperatures"—European Federation of Chemical Engineering.

*Primary Examiner*—Charles Hart

[57] ABSTRACT

An apparatus and method for cleaning hot gases containing gaseous contaminants and particulate contaminants, including sticky components where a vessel contains a walled housing and a divider which separates an enclosed area therebetween into dirty and clean gas sections. A moving bed of coarse particulate material is contained in the walled housing with gases, after flow through a portion of the moving bed, passing into the second section where hollow, ceramic, barrier filter units remove the remaining solids therefrom. Sorbent material removes gaseous contaminants, sticky components are retained in the moving bed of coarse particulate material, and the filter units remove fines so that the hot gases are discharged clean from the vessel.

16 Claims, 4 Drawing Sheets

Sizing criteria for Barrier Filter with moving Bed Contractor (m = 640 lb/sec.)

APPARATUS AND METHOD FOR REMOVING GASEOUS CONTAMINANTS AND PARTICULATE CONTAMINANTS FROM A HOT GAS STREAM

CROSS-REFERENCE TO RELATED APPLICATION

This application is related to application Ser. No. 351,136, filed on even date herewith, in the names of Richard A. Newby, David F. Ciliberti and Thomas E. Lippert, entitled "Fluidized Bed System for Removing Particulate Contaminants from a Gaseous Stream" (W.E. No. 54,570), which application is assigned to the assignee of the present invention.

FIELD OF THE INVENTION

The present invention relates to an apparatus and method for removing gaseous contaminants and particulate contaminants, including sticky components, from a hot gaseous stream, such as hot gaseous streams from power plant combustors or coal conversion systems.

BACKGROUND OF THE INVENTION

Control of emissions from power plant stations continue to be an important factor in the strategic planning of utility and industrial customers and in the development and application of new or advanced power generation technologies. The approach of repowering to meet new capacity demand and the need to retrofit existing systems to meet compliance, with the possibility of new and tougher environmental legislation (acid rain) and with the high cost of current pollution control equipment provide incentive to develop advanced emission control systems. In this area, advanced dry scrubbing techniques are being developed that use injection of fine sorbents into the furnace region that selectively getter gas phase contaminants such as oxides or sulfur; alkalis and other acid gas constituents. These sorbents are then collected downstream of the furnace region for disposal using conventional baghouse or electrostatic precipitator. In many instances, the quantity of sorbent material required is large and thus significantly increases the total dust and ash loading to downstream equipment. In conventional power plants such as coal boilers or waste to energy plants, this results in increased deposits, soot blowing, more rapid tube erosion, higher operating costs and lower system performance.

Advanced coal conversion systems such as pressurized, fluidized bed combustion (PFBC), coal gasification combined cycle, and the direct coal fueled gas turbine cycles that are being proposed will also benefit by minimizing carryover of ash and sorbent materials to provide emissions control and the protection of turbines from corrosion, erosion damage.

The need therefore is the development of a particulate barrier filter device capable of operating at temperatures from 500° to about 2500° F. that can collect potentially sticky ash and sorbent particles; be operated at reasonable pressure drop, be cleaned on-line using simple pulse jet or reverse flow principles and capable of achieving very high collection efficiencies (99.9%). Such devices must be compact (fit into relatively defined space requirements), low cost, and adaptable to various applications (i.e., large stationary power plants, small cogeneration and transportation power generation systems).

SUMMARY OF THE INVENTION

An apparatus for separating gaseous contaminants and particulate contaminants, including sticky components from a hot gaseous stream has a vessel which defines an interior chamber and a walled housing disposed in the vessel that contains a moving bed of solid coarse particulate material. The walled housing forms an enclosed area between the housing and the vessel and a dividing wall separates the enclosed area into a first section into which a flow of dirty hot gases is passed and a second section from which clean gases are discharged. The walled housing also contains a supply of sorbent material for removal of gaseous contaminants from the hot gaseous stream with at least one aperture provided in the wall of the housing for flow of the dirty gases from the walled housing into the first section of the enclosed area, while the coarse particulate material of the moving bed is retained in the housing for subsequent discharge therefrom.

A plurality of hollow, ceramic, barrier filter units are disposed in the first section of the enclosed area, the filter units having open tops that communicate with the second section of the enclosed area. Sticky components in the hot gaseous stream are retained on the coarse particulate material of the moving bed or are combined with sorbent material to form a non-sticky residue, while the filter units separate fine particulates from the hot gaseous stream and the cleaned hot gases are discharged from the second section of the enclosed area.

The sorbent material may comprise the coarse particulate material of the moving bed or may be separately charged as fine particulates into hot gaseous stream charged to the vessel and into the moving bed of coarse particulate material.

The hollow, ceramic, barrier filter units may be in the form of cross-flow filter units, hollow ceramic tubular filter units or hollow ceramic bags, while the aperture in the walled housing may be in the form of louvers or a continuous circular aperture formed between spaced upper and lower sections of the walled housing.

According to the present method of cleaning a hot gaseous stream, at a temperature of between about 500° to 2500° F., containing gaseous contaminants and particulate contaminants containing sticky components, the hot gaseous stream is mixed with a fine particulate sorbent for the gaseous contaminants, the sorbent having a particle size of about 1 to 20 micrometers in diameter, and the mixture passed through a moving bed of coarse particulate material. The sticky particulate components agglomerate with the sorbent or adhere to the coarse particulate material in the moving bed while the gaseous contaminants react with the fine particulate sorbent. The gaseous stream is passed through a portion of the moving bed and then through hollow, ceramic, barrier filter units to remove the remaining solids from the hot gaseous stream.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION

The present invention integrates gas and solid-phase contaminant control functions into one containment vessel that provides means for handling sticky components, such as ash. In the present invention finely sized sorbents are injected into the high temperature gas stream (combustion gas for example). The finely sized injected sorbents react with the gas-phase contaminant species while modifying the sticky nature of the ash. A slow moving bed of coarse granular material (coarse sorbent or inert matter) is placed in the gas stream between a hollow, ceramic, barrier filter unit and the sorbent injection point. The moving bed of granular material is intended to promote gas solid contact for these purposes. The barrier filter units are used ultimately to collect the fine sorbent and ash particles that pass through the moving bed of granular material.

Figure 1:
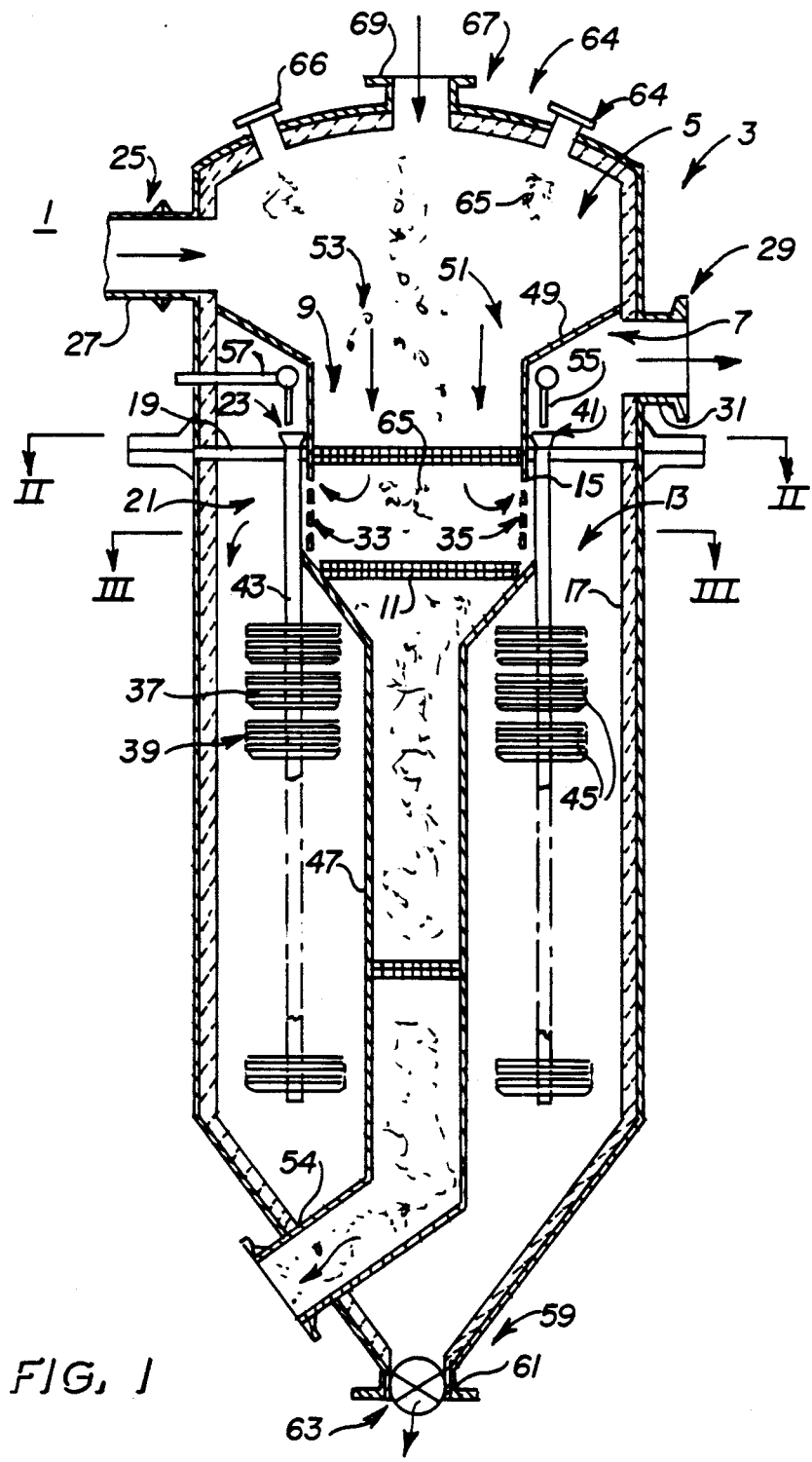
FIG. 1 is a schematic longitudinal section of an embodiment of the apparatus of the present invention using cross-flow filter units.
Figure 2:
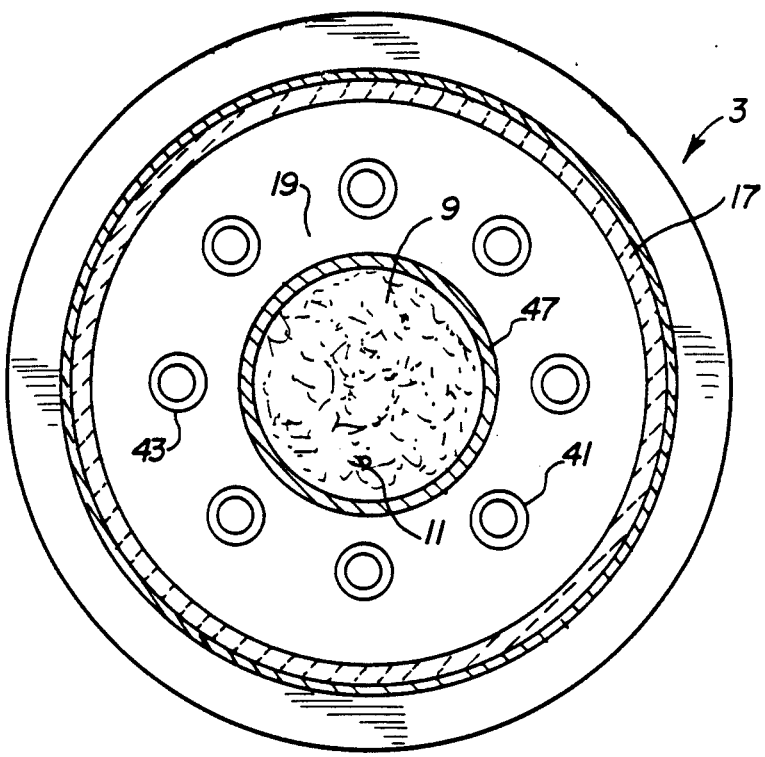
FIG. 2 is a view taken along lines II—II of FIG. 1.
Figure 3:
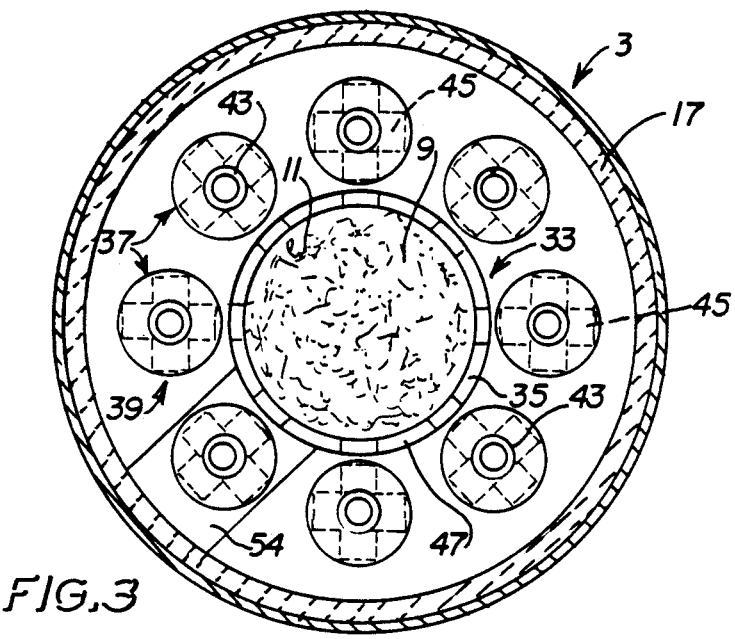
FIG. 3 is a view taken along lines III—III of FIG. 1.

Referring now to the drawings, FIGS. 1 to 3 illustrate an embodiment of an apparatus 1 for separating gaseous contaminants and particulate contaminants, including sticky components, from a dirty hot gas stream. The apparatus 1 comprises a vessel 3 which defines an interior chamber 5. Within the vessel 3 there is coaxially disposed a walled housing 7, which contains a moving bed 9 of solid coarse particulate material 11. The walled housing 7 defines an enclosed area 13 between the wall 15 of the housing and the wall 17 of the vessel. A dividing wall 19, transverse the axes of vessel 3 and the walled housing 7 separates the enclosed area 13 into a first section 21 for flow of dirty hot gases therethrough and a second section 23 for flow of cleaned gases therethrough. A means 25 for introducing hot dirty gases into the vessel 3 and into the walled housing 7 is provided, illustrated as an inlet 27 communicating with the interior of the vessel 3 through the wall 17, while a means 29 for discharging clean gases from the second section 23 of the enclosed area is provided, illustrated as an outlet 31 through the wall 17.

The walled housing 7 has at least one aperture 33 in the wall 15 thereof which enables flow of dirty gases from the interior of the walled housing 7 into the first section 21 of the enclosed area 13, illustrated in FIG. 1 as a plurality of louvers 35, with substantially no flow of coarse particulate material 11 therethrough.

A plurality of hollow, ceramic, barrier filter units 37 are disposed in the first section 21 of the enclosed area 13 which communicate with the second section 23 of the enclosed area, such that the hot gases pass through the hollow filter units 37 and deposit fine particulate contaminants on the outer surface 39 thereof, while clean gases pass through the filter units and through the open tops 41 thereof, which tops communicate with the second section 23 of the enclosed area 13 for discharge through the outlet 31.

The use of high performance, compact, hollow, ceramic, barrier filter units 37 is essential to achieving a low emissions goal. Several high-temperature hollow, ceramic, barrier filter units are currently available or under development for pressurized fluidized bed combustion and coal gasification applications. These filter units include the Westinghouse ceramic cross flow filter, as described in U.S. Pat. No. 4,343,631, the contents of said patent incorporated by reference herein, woven ceramic bag filter units, and hollow ceramic candle filter units, such as sintered ceramic (SiC) candles.

These filter units have all demonstrated collection efficiencies greater than 99.9% and the ability to be cleaned on-line by simple pulse jet methods. The candle and cross flow filter units represent rigid, barrier filter units whose manufacture is limited to relatively small unit sizes. The application of these ceramic units in commercial filter systems requires the "packaging" of a large number of individual units to a central, vertical plenum section. This construction provides a filter module with characteristically large length-to-diameter (L/D) ratios, which in turn maximizes the amount of filter surface that can be packaged per unit of vessel cross section. For the barrier filter types being considered in this invention, the size and filter area parameters are summarized in Table 1. Based on an assumed 15 ft. long module, the cross flow filter unit appears to offer maximum surface area packing per unit of vessel cross section of the three above types of filter units.

TABLE I

| Sizing Parameters for Filter Units | | | |
|---|---|---|---|
| Filter Units | Center to Center Spacing (Ft) | Filter Area Per Module (Ft$^2$) | Capacity (acfm) |
| Candle (c)[1] | 0.32 | 3 | 30 to 60 |
| Extended candle (EC)[2] | 1.0 | 56 | 560 to 1120 |
| Woven Bags (B)[3] | 0.58 | 24 | 120 to 240 |
| Cross Flow (x)[4] | 1.67 | 400 | 4000 to 8000 |
| Si$_3$N$_4$ Tubes (T)[5] | 1.0 | 56 | 560 to 1120 |

[1]Candles having a length of 1.5 m, an outer diameter of 2.36" and wall thickness of 40 mm.
[2]Extended candle, length of center tube of 15', 18 candles spaced along length of tube.
[3]Ceramic woven bags having a length of 15' and a diameter of 6 inches.
[4]Ceramic cross flow filter elements with 40 filter elements of a size of 12" × 12" × 4" over a length of 15'.
[5]Si$_3$N$_4$ tubes, length of center tube of 15', 18 candles.

Figure 4:
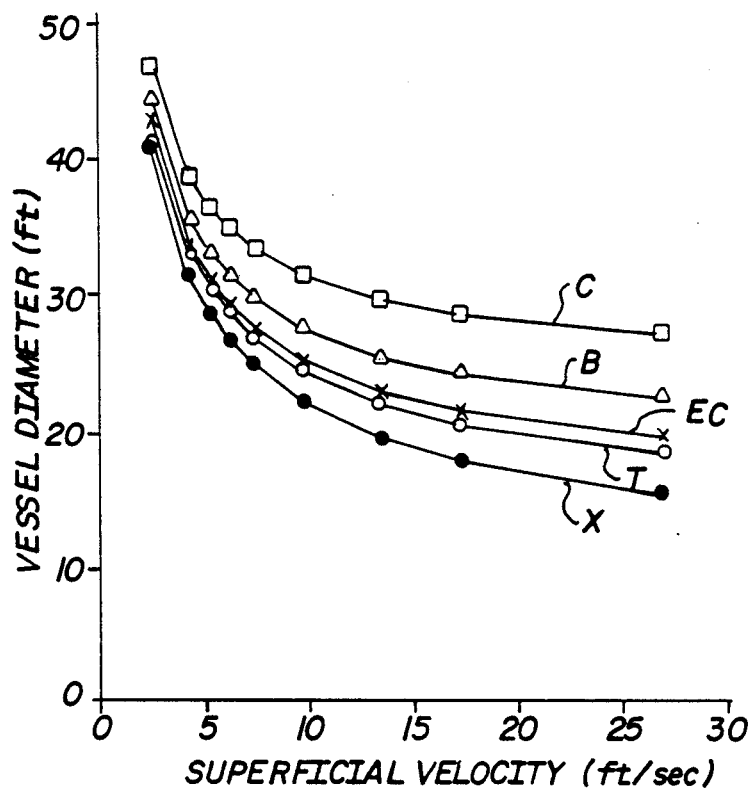
FIG. 4 is a graphical representation of the calculated vessel diameter as a function of the superficial velocity through the moving bed contactor of the present apparatus for different types of hollow, ceramic, barrier filter units.

Using the filter unit sizing parameters given in Table I, preliminary sizing criteria for a utility size gas turbine system with the apparatus have been developed. FIG. 4 shows the calculated vessel 3 diameter as a function of the superficial velocity through the apparatus for different types of hollow, ceramic, barrier filter units 37. The superficial velocity parameter sets the diameter of the vessel 3 as well as its operating pressure drop. Preliminary calculations show that reasonable pressure loss (3 psi) can be achieved over a 4 inch deep bed of 0.20 inch diameter coarse particulates. For low pressure systems (conventional boilers), lower operating pressure drops are achieved by adjusting face velocity and particulate 11 size. The present apparatus should be usable for cleaning gases under pressures of atmospheric pressure to about 30 atmosphere pressure.

The diameter of the vessel 3 is determined by both walled housing 7 size and required space to fit the hollow, ceramic, barrier filter units 37. This vessel diameter as indicated in FIG. 4 depends on the choice of barrier filter unit and choice of superficial velocity. At low superficial velocity, the sizing of the vessel is governed by the size of the walled housing 7. At high bed velocity, the vessel size depends on the type of hollow, ceramic, barrier filter unit 37. It should be noted that the sizing criterion shown in FIG. 4 is based on filter operating face velocities that have been achieved in high-temperature test work. The results show that, for the application assumed, the proposed integrated gas cleaning system could be packaged into a vessel 3 of 15 to 25 feet diameter.

In FIGS. 1 to 3, the filter units 37 are illustrated as ceramic cross flow filters as described in U.S. Pat. No. 4,343,631. As described, the filter units each comprise a duct 43 having an interior space communicating with the second section 23 of the enclosed area 13 through open top 41, and a plurality of filters 45 affixed to and extending outwardly from the duct 43, the filters 45 having inlet channels in fluid communication with the first section 21 of the enclosed area 13 and outlet channels in fluid communication with the interior space of the duct 43. The inlet and outlet channels are separated by a ceramic membrane that is permeable to hot gases and impermeable to fine particulate material.

As illustrated, the walled housing 7 is preferably coaxially positioned in the vessel 3, which is vertically extending, and has a cylindrical member 47 with a flange 49 at the upper end 51 that extends outwardly to the interior of the wall 17 of vessel 3. The flange 49 forms an inlet 53 to the cylindrical member 47 in the second section 23 of the enclosed area 13, with the cylindrical member 47 having an outlet 54, which extends through the wall 17 of the vessel 3, in the first section 21 of the enclosed area 13. Jet pulse nozzles 55 are situated in the second section 23 of the enclosed area 13 which periodically dispense a jet pulse of gas from manifold 57, fed by a source of gas (not shown) so as to periodically direct the gas as a backwash and dislodge collected deposits of particulate contaminants from the filter elements. The discharged particulates fall by gravity to the bottom 59, or hopper, of the vessel 3 and are discharged through a discharge port 61 containing a valve 63.

A means 64 for adding a sorbent material 65, illustrated as injection ports 66, is present at the top region 67 of the vessel 3, while an inlet 69, also at the top region 67 provides for addition of solid coarse particulate material 11 to the bed 9.

Figure 5:
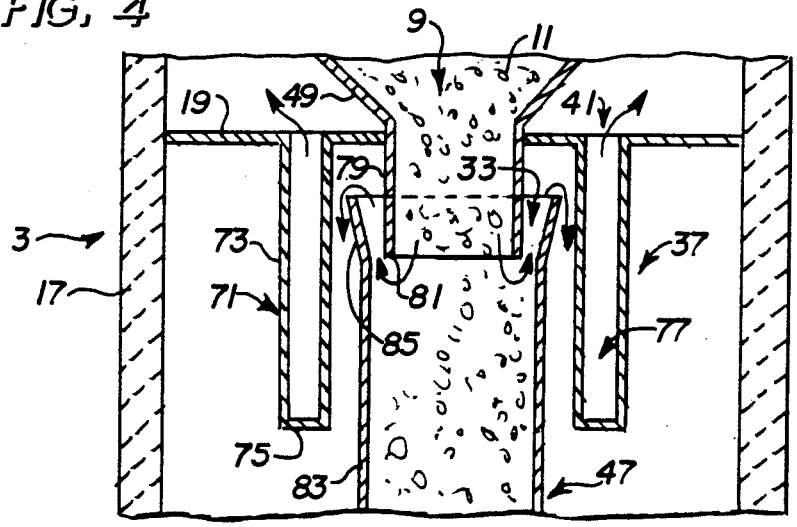
FIG. 5 is a schematic longitudinal section of a portion of another embodiment of the apparatus of the present invention using hollow cylindrical filter units.

An alternative embodiment of the apparatus 1 is illustrated in FIG. 5 where hollow cylindrical filters, in the nature of "candle" filters are used and the walled housing 7 is of an alternate design. The hollow, ceramic, barrier filter units 37 are in the form of hollow cylindrical filters 71 which have a porous closed side wall 73 and closed bottom 75, defining a hollow 77 into which gases flow and thence out through the open top 41 thereof. The cylindrical member 47, as illustrated, is separated into an upper section 79 having a lower terminus 81, and a lower section 83 with a flared portion 85 that is spaced from and overlaps the exterior of terminus 81 of the upper section 79 such that aperture 33 is provided by the spacing between sections 79 and 83.

The use of ceramic bags may be substituted for the hollow cylindrical filters 71 using the apparatus illustrated, the ceramic bags merely being ceramic woven hollow cylinders rather than the rigid candle-type filters.

Figure 6:
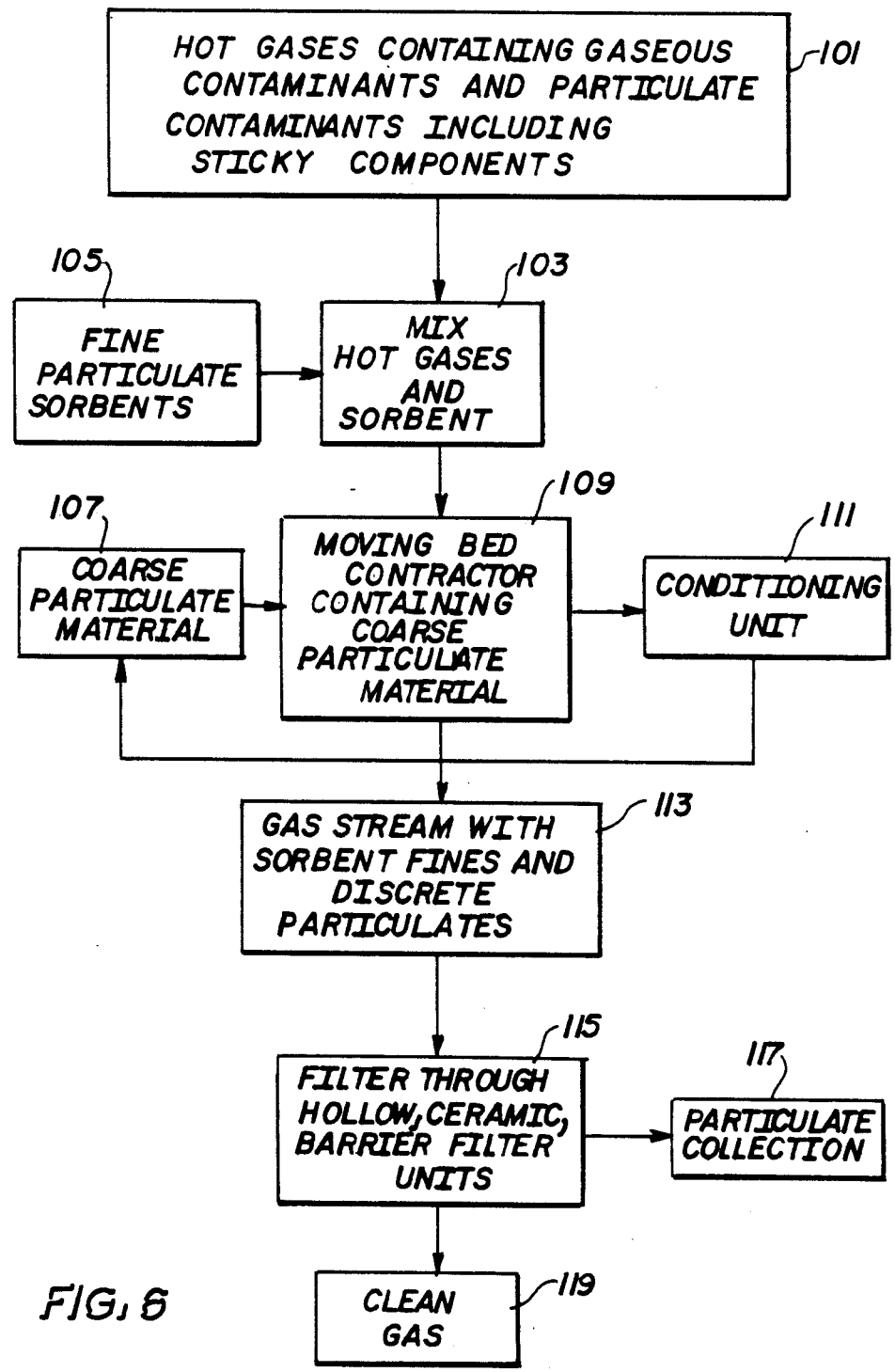
FIG. 6 is a flow chart schematically illustrating the method of the present invention.

The apparatus as hereinbefore described is usable in a method for cleaning a hot gaseous stream, at a temperature of between about 500° to 2500° F., containing gaseous contaminants and particulate contaminants including sticky components. The present method is illustrated schematically in the flow chart of FIG. 6. As illustrated, hot gases containing gaseous and particulate contaminants from a source 101 are mixed at 103 with a fine particulate sorbent for the gaseous contaminants, from a source 105. The mixture so formed is then passed through a moving bed of coarse particulate material, from a source 107 in a moving bed contactor 109. The sticky components agglomerate with the sorbent material and adhere to, and are retained with, the coarse particulate material. The coarse particulate material is removed from the moving bed contactor 109 and reclaimed in a conditioning unit 111 for recycle to the source of coarse particulate material 107. The gaseous contaminants react with the fine sorbent material and are separated therefrom as solids. The gaseous stream 113, which contains sorbent fines and discrete particulates, after passage through at least a portion of the coase particulate material in the moving bed contactor 109, are passed through hollow, ceramic, barrier filters 115 to remove substantially all remaining solids therefrom, with the particulates collected at 117 and the clean gas removed at 119.

The fine particulate sorbent from source 105 should be of a particle size of between 1 to 20 micrometers in diameter, and the specific sorbent material used will depend on the specific gas phase contaminants to be removed from the hot gaseous stream, such as sulfur dioxide, acidic gases such as HCl, or alkali components such as sodium or potassium components. Selection of specific sorbent types for each contaminant will depend on the process and operating conditions of the process. For example, the use of limestone or dolomite for sulfur removal is well established for gas temperatures up to about 2000° F. Barium oxide (BaO) and strontium oxide (SrO), as simple oxides or in various mixed oxide forms may be substituted at temperatures up to 2500° F. These materials are also useful for acid gas removal at comparable temperatures. Emathlite and bauxite are known sorbents for alkali at temperatures up to about 1800° F. Fine particulate sorbents, 1 to 20 micrometers in diameter, are used because of their high surface area to volume characteristics and will have short residence time requirements. Secondary air, along with ammonia may also be injected for additional control of nitrogen oxides.

After mixing of the fine particulate sorbents, the gaseous stream, carried-over ash particles, and injected sorbents pass into the moving bed contactor containing the coarse particulate material, which is of a size of at least 1000 micrometers in diameter. The hot gaseous stream passes through the top zone of the moving bed 9 of coarse particulate material 11 and flows radially outwardly through the aperture 15 in the walled housing 7. The gases then pass through the hollow, ceramic, barrier filter units 37 with the particulates separated therefrom. The coarse particulate material 11 of the moving bed 9 with captured solids is discharged from the walled housing 7 for disposal and recycling. Fresh material is added to the vessel 3 thus continuously renewing the surface of the moving bed that is exposed to the incoming gaseous stream. Some or all of the fine particulates, predominantly sorbent fines, are expected to penetrate through the coarse particulate material 11 and be carried out through the aperture 15 in the walled housing 7, into the first section 21 of the enclosed area 13. The gas and fines flow downwardly to the hollow, ceramic, barrier filter units 37 enhancing the filter cleaning process. The gas passes through the hollow, ceramic, barrier filter units 37 and is discharged from the second section 23 of the enclosed area 13. Solids retained on the outer surface 39 of the hollow, barrier, filter units 37 are dislodged by pulse jet cleaning of the filters. These solids are agglomerated in cake form and once dislodged from the filters, fall to the bottom of the vessel and are discharged for disposal.

The present apparatus and method are especially useful for cleaning of hot gases from combustion processes, such as gases from a pulverized-fuel electric utility boiler, which gases contain coal ash with sticky components, but is adaptable for cleaning of other hot gaseous streams.

What is claimed is:

1. An apparatus for separating gaseous contaminants and particulate contaminants, including sticky components, from a dirty hot gaseous stream comprising:
   a vessel defining an interior chamber;
   a walled housing disposed in said vessel for containing a moving bed of coarse particulate material therein, forming an enclosed area between the housing and said vessel;
   means for moving said bed through said housing;
   a dividing wall separating said enclosed area into a first section for flow of dirty hot gases therethrough and a second section for flow of cleaned gases therethrough;
   means for introducing said dirty gaseous stream into said vessel and into said walled housing;
   means for discharging clean gases from said second section of said enclosed area;
   a supply of sorbent material disposed in said walled housing, after passage through at least a portion of said moving bed, sufficient to remove gaseous contaminants from said hot gaseous stream;
   said walled housing having at least one aperture in the walls thereof for flow of dirty gases from said walled housing into said first section of said enclosed area, with substantially no flow of said coarse particulate material therethrough; and
   a plurality of hollow, ceramic, barrier filter units disposed in said first section of said enclosed area communicating with said second section of said enclosed area; such that sticky particulate contaminants are retained on said coarse particulate material, or are combined with said sorbent material to form a non-sticky residue, said gases pass through said hollow filter units and deposit fine particulate contaminants thereon, and cleaned gases pass through said hollow, ceramic, barrier filter units into the second section of said enclosed area, for discharge therefrom.

2. The apparatus as defined in claim 1 wherein said bed of coarse particulate material is composed of a sorbent for gaseous contaminants and comprises said supply of sorbent material.

3. The apparatus as defined in claim 2 including means for adding additional sorbent material, in the form of fine particulates, of a size between about 1 to 20 micrometers, into said vessel and into said gaseous stream and said moving bed.

4. The apparatus as defined in claim 1 including means for adding said supply of sorbent material, in the form of fine particulates of a size between about 1 to 20 micrometers, into said interior chamber for reaction with the gaseous contaminants.

5. The apparatus as defined in claim 1 wherein said filter units each comprise a duct having an interior space communicating with said second section of said enclosed area and a plurality of filters affixed to and extending outwardly from said duct, said filters having inlet channels in fluid communication with said first section of said enclosed area and outlet channels in fluid communication with said duct interior space, said inlet and outlet channels being separated by a ceramic membrane permeable to said hot gaseous stream and impermeable to said fine particulate contaminants.

6. The apparatus as defined in claim 1 wherein said filter units comprise hollow cylindrical filters having a porous closed side wall and bottom and an open top communicating with said section of said enclosed area.

7. The apparatus as defined in claim 1 wherein said filter units comprise hollow ceramic bags having a porous closed side wall and bottom and an open top communicating with said second section of said enclosed area.

8. The apparatus as defined in claim 1 wherein said walled housing comprises a generally cylindrical member coaxially disposed in said vessel having a flange extending outwardly to the interior wall of said vessel to form an inlet thereto in said interior chamber, and an outlet extending through the wall of said vessel, in the first section of said enclosed area, distant from said inlet.

9. The apparatus as defined in claim 8 wherein said generally cylindrical member is vertically disposed and comprises an upper section having a lower terminus and a spaced lower section, said lower section overlapping the terminus of said upper section such that said at least one aperture is provided by the spacing between said upper and lower sections.

10. The apparatus as defined in claim 1 including means for dislodging collected deposits of particulate contaminants from said filter units and means for discharging said dislodged particulate contaminants from said second section of said enclosed area.

11. A method of cleaning a hot gaseous stream containing gaseous contaminants and sticky particulate contaminants comprising:
   mixing with said hot gaseous stream a fine particulate sorbent for said gaseous contaminants;
   passing the mixture so formed through a moving bed of coarse particulate material such that said sticky particulate contaminants agglomerate with said sorbent or adhere to said coarse particulate material and are separated from said gaseous stream and said gaseous contaminants react with said sorbent; and
   passing the gaseous stream, after flow through said moving bed of coarse particulate material, through a hollow, ceramic, barrier filter unit to remove substantially all remaining solids therefrom.

12. The method as defined in claim 11 wherein said fine particulate sorbent is of a particle size of between 1 to 20 micrometers in diameter.

13. The method as defined in claim 12 wherein said coarse particulate material is of a size of at least 1000 micrometers in diameter.

14. The method as defined in claim 13 wherein said hot gaseous stream is at a temperature of between 500° to 2500° F.

15. The method as defined in claim 13 wherein said hot gaseous stream comprises the discharge from a coal combustion unit and contains oxides of sulfur and said fine particulate sorbent is selected from the group comprising limestone, dolomite, barium oxide and strontium oxide.

16. The method as defined in claim 13 wherein said hot gaseous stream contains alkali constituents and said fine particulate sorbent is selected from the group comprising emathlite and bauxite.

* * * * *